United States Patent [19]

Hartmann

[11] 4,213,360
[45] Jul. 22, 1980

[54] PROCESS FOR PRODUCTION OF INDIVIDUAL PORTIONS FROM BLOCKS OF DEEP-FROZEN FOODSTUFFS

[76] Inventor: Karl Hartmann, D 285 Bremerhaven 3, Brinkmannstrasse 6, Fed. Rep. of Germany

[21] Appl. No.: 890,952

[22] Filed: Mar. 28, 1978

[30] Foreign Application Priority Data

Apr. 7, 1977 [DE] Fed. Rep. of Germany ....... 2715535

[51] Int. Cl.² .................... A22C 125/18; B26D 3/24
[52] U.S. Cl. .......................................... 83/15; 17/52
[58] Field of Search ................... 83/425, 425.1, 425.2, 83/425.3, 15; 17/52

[56] References Cited

U.S. PATENT DOCUMENTS 3,273,617  9/1966  Lamb ............................. 83/425.1 X

*Primary Examiner*—Willie G. Abercrombie
*Attorney, Agent, or Firm*—Fleit & Jacobson

[57] ABSTRACT

A method for dividing a block of deep-frozen foodstuffs, especially fish fillets, into portions of predetermined size. The method utilizes a operating temperature between −6° C. and −30° C. and a processing pressure of at least 100 at. In the method, the block is squeezed in a first direction, preferably perpendicular to its largest or greatest surface, through a blade lattice formed of parallel knives. The plates formed by squeezing the block through the first blade lattice are carved into portions of desired size by performing second cuts perpendicular to the first cuts. The second cuts are preferably perpendicular to the largest surface of the original block. In a preferred embodiment, the second cuts are performed by squeezing the plates through a second blade lattice formed of parallel knives. As the block or plates are being squeezed through the blade lattice, they can be squeezed in another direction perpendicular to the direction of squeezing to increase their height. An apparatus for performing the described method is also disclosed.

7 Claims, 16 Drawing Figures

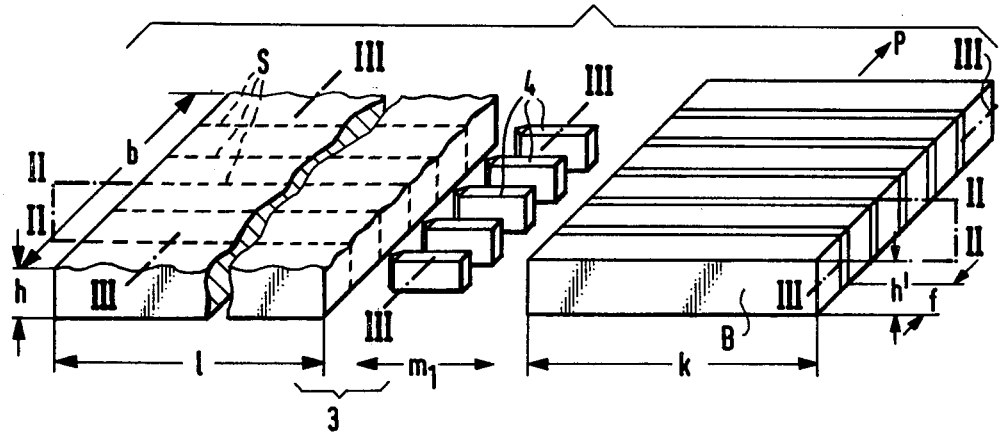
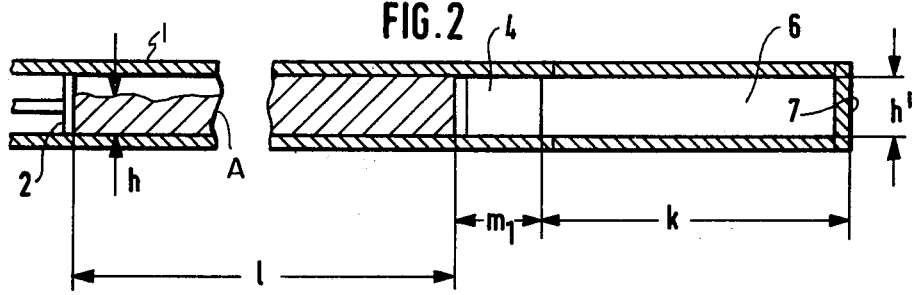
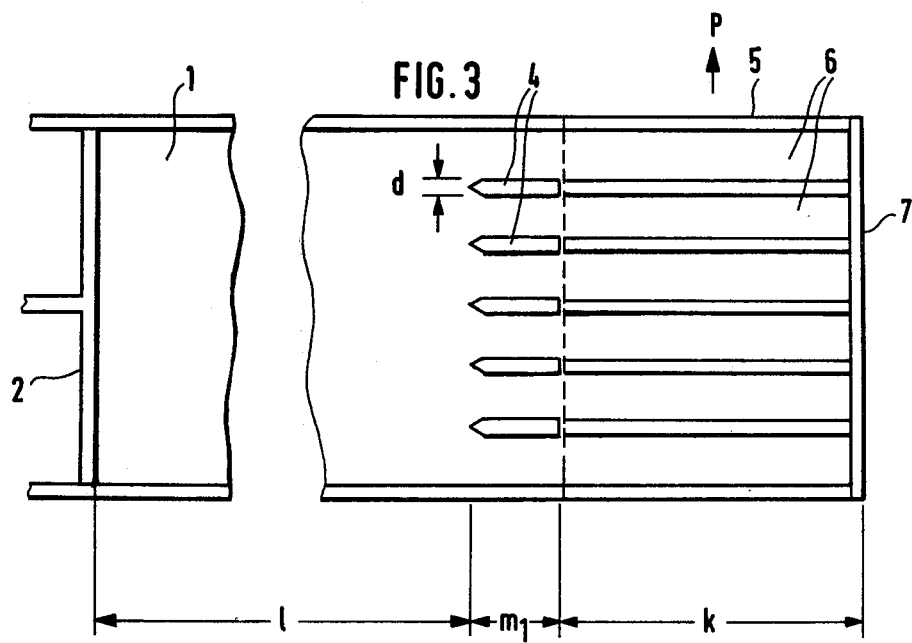

PROCESS FOR PRODUCTION OF INDIVIDUAL PORTIONS FROM BLOCKS OF DEEP-FROZEN FOODSTUFFS

BACKGROUND OF THE INVENTION

1. Field of the Invention

This invention relates to an apparatus and method for producing individual portions of predetermined size from larger blocks of deep-frozen foodstuffs. More particularly, the invention relates to such an apparatus and method wherein the frozen block is a block of frozen fish and wherein two series of cuts are necessary to form the portions of predetermined size.

2. Description of the Prior Art

It is common practice aboard commercial fishing boats or trawlers to process fish and form frozen blocks from the processed fish. For blocks frozen at sea certain measurements have for reasons of processing technique proven to be optimal and have today practically become international norms, namely approximately 800–810×505–510×60–65 mm., e.g., 806×508×62.5 mm. The most critical of these dimensions is the height. The thinner the block is made, the more labor-consuming and thus expensive is its production. In view of the especially high wage costs aboard ships, any reduction in block thickness therefore signifies a noticeable increase in production costs. On the other hand, an increase in block thickness causes a retardation in the flow of heat in freezing, which leads to an impermissible decrease in quality when a thickness of approximately 60 to 65 mm. is exceeded, principally due to the formation of crystalline ice needles which bore through the cell walls and can lead to the loss of cellular fluids when the fish is thawed. The length and width measurements of the block have proved through practical experiences to be a serviceable compromise between manageableness on the one hand and optimal weight on the other.

Numerous factors influence the size of the fish sticks to be finished from the block—namely the following: At least one dimension (thickness) should be small enough to guarantee a rapid flow of heat during cooking and yet large enough so that, together with another dimension (width), it gives the form enough stability so that it can be comfortably handled, while the third dimension (length) should be so adjusted to the other two that the volume of the rectangular solid corresponds to a handy morsel. The dimensions which have been found through trial and error to be optimal on the basis of these requirements, namely (11–12)×(19–20)×(80–85) mm., e.g., 11.5×19×83 mm., corresponding to a weight of 28.5 g., or 11.5×20×83 mm., corresponding to a weight of 30 g., have become unofficial standards for the Common Market.

A number of procedures have been developed for the production of individual portions from larger blocks of deep-frozen foodstuffs, e.g., for the production of fish sticks from frozen blocks of fish fillets. One obtains qualitatively excellent products (i.e., fully identical to the original material in structure, texture, and taste) by means of the division of the deep-frozen blocks into discs of strips through the use of thin saws or grinding wheels at temperatures ranging between −15° C. and −30° C. Also, in some cases, further double cutting of these discs or strips is required in directions transverse to the first cutting direction to obtain the final product.

One of the disadvantages of the previously described technique is that a substantial portion of the original material (generally 8 to 15%) is waste, either as fish "sawdust" or as slime. Even if this waste portion can be made usable in some form or other and does not represent a total loss, it is saleable or re-usable only at a much lower price than that of the original material or that of the finished product.

Thus, there have been numerous attempts to avoid or limit these losses during separation.

One such attempt or process involves the thawing of the block before its division and, when necessary, the refreezing of the individual portions. There is such a great loss in quality that today this process is hardly used.

Another known process for the practically loss-free division of a block of deep-frozen foodstuffs, in particular the division of a frozen block of fish filets into individual portions, is described in German Pat. No. 2,045,059. According to this reference, a block is placed in a pressing chamber at a temperature between −10° C. and −30° C. A plunger under pressure then presses the block out of the chamber through an immoveable wall having a number of openings. The openings are narrowed in the direction of egress and form pressure-proof channels enclosed on all sides. The block flows in a series of strips through the openings. During this procedure, pressure is maintained at least until pressure on the plunger, which has fallen below an initial value during the extrusion, has again built up to at least the initial value. During the pressing process, one is careful not to allow the temperature in the mass of the foodstuff to exceed a critical level determined by the fat content of the original material to be processed, normally between −10° and −15° C. Preferred working pressures are above 180, in particular above 240 at. The majority of the openings narrowed in the direction of egress are formed by a blade lattice arranged checkerboard-style and enclosed by a pressure-proof wall.

The structure, texture, and taste of the original material are frequently maintained very well when the initial block is divided according to this process. It is possible to directly obtain lengths of such width and thickness as is customary, e.g., for fish sticks, that need only be cut to a desired length. Sometimes, a loss of quality arises in the application of this process, primarily because the finished product exhibits a taste which is too "dry". Systematic investigations have shown that this undesired effect always arises if a pressing ratio is applied which is too high, primarily when the ratio is greater than 1.6:1. The term pressing ratio is used to identify the change in diameter of the material as it passes through the narrowed openings. The change occurs as a result of the extension of the material in the direction of the flow and is proportional to the amount of extension.

With the apparatus described in German Pat. No. 2,045,059, a pressing ratio less than 2.5:1 is often difficult to maintain, particularly with the processing of material which requires a pressure higher than approximately 150 at. In order to be able to withstand the great stress created by the high pressure, the blades forming the openings must be constructed with a minimal thickness of between 7.5 and 8 mm. This creates a problem in the production of lengths with the cross section customary for fish sticks (approximately 11 to 12 mm. by 18 to 20 mm.). Use of a lattice formed of blades of this thickness results in a pressing ratio of about 2.5:1, which is within a tolerable range of a 3:1 (maximum) but which is nevertheless still significantly above the range recognized through research to be optimal, i.e., a maximum of 1.6:1.

Subsequent suggested processes, see German Offenlegungsschrift No. 2,142,341.6 and German Offenlegungsschrift No. 2,222,205.5, utilize devices that keep the pressing ratio within certain limits, namely a maximum of 3:1 and preferably below 2:1. These devices utilize narrowed openings, through which the material is pressed at the same high pressure and low temperatures as in the previously discussed process, which are constructed as a single (or a unit constructed of at most two parts) tapered, pressure-proof forming channel instead of as a blade lattice.

In this way any desired pressing ratio, even one below the minimal values required for this process (viz., 1.1:1) can in fact be maintained. Nevertheless a simultaneous division of the block into a number of lengths, as in the first-cited process, is impossible.

SUMMARY OF THE INVENTION

The present invention concerns a further development of the previously described known procedures and devices. Practice of the invention makes it possible—at one time and with material losses no greater and, according to a preferred embodiment of the invention, even still lower than those encountered with the procedures described in the German references—to divide a deep-frozen block of foodstuffs, particularly a frozen block of fish filets, into several strands of desired dimensions. Also, a pressing ratio is utilized which is so low that losses in quality are avoided. As previously discussed, a pressing ratio not exceeding approximately 1.6:1 is required in order to eliminate any loss in taste or other qualities.

The maintenance of such a low pressing ratio with blade lattices, which is an indispensable pre-condition for simultaneous division into a number of strands, is made possible according to the invention by the fact that the division is undertaken in two steps. In the first step, the block is pressed, preferably in a direction perpendicular to its largest surface, through a blade lattice under known procedural conditions (temperature in the block below $-6°$ C., preferably between $-15°$ C. and $-20°$ C., pressure at least 100 at, preferably above 150 at). The blade lattice contains a single row of parallel, preferably vertical, blades, without any cross-blades. Thus, the block is cut at one time into a number of plates of desired thickness, specifically the width of the fish sticks which are to be produced, e.g., 20 mm. The stress on the single row of blades is substantially reduced as a result of the absence of cross-cutting blades arranged in checkerboard-fashion, so that narrower blade widths can be used. Also, the additional cross section reduction effected by the cross-blades is inoperative, so that with the arrangement specified by the invention—even with the maintenance of an unreduced blade thickness of, e.g., 7.5 mm.—it is possible to produce plates with a thickness of, e.g., 20 mm. from the block with a pressing ratio of approximately 1.375:1.

The plates thus produced can in principle be divided into the finished portions in any way, e.g., through saw-cutting. It is, however, preferable that the further division or second cuts likewise take place without loss. Thus, as in the first step of the procedure, the second cuts are performed by pressing the plates through a second blade lattice composed of a single row of parallel blades, the process taking place under substantially the same pressure and temperature conditions as in the first step. Preferably, the plates are pressed through the second blade lattice in such manner that the second cuts are perpendicular to the largest surface of the original frozen block. Preferably, the second cuts are also perpendicular to the smallest dimension of the original block.

Since only very small cut lengths (approximately 2 cm. maximum) need to be undertaken in the second step of the procedure, narrower blade thicknesses can be used. Thus, in this step of the process, extremely low pressing ratios can be sustained.

A preferred execution of the invention provides for a particularly rational utilization of frozen blocks of fish filets (especially those frozen at sea).

As previously discussed, the measurements for fish sticks on the one hand and frozen blocks of fish filets on the other have been influenced by different factors. As a result, no dimension of a frozen block of fish filets is an integral multiple of any dimension of a fish stick. Thus, bordering cuts are normally necessary with previously known methods before the division of a block into fish sticks. The material cut away in this bordering represents a partial loss like the "sawdust" which arises from sawing or division by means of a grinding blade, since it cannot be sold at the full value of the initial material. Since the height of the block, with a maximum of 65 mm., is in each case substantially less than the length of a fish stick, with a minimum of 80 mm., according to the known procedures fish sticks cannot be cut from the block in such a way that their long dimensions runs in the height-direction of the block.

One embodiment of the invention, through the use of a special artificial grip, however, makes it possible to divide a block of fish filets of the usual measurements into fish fingers which also have the usual measurements, without any preceding trimming of borders and without loss. This is done in such a way that the finished fish sticks are finally cut out in the height-direction of the initial block. The effectiveness of this special artificial grip lies principally in allowing the extension of the material transverse to the pressure applied, which extension is effected by permitting pressing to occur in the direction of the flow and in a direction at least partially transverse to this direction, i.e., in the direction of the original height of the block. This method of pressing is used in either one or, preferably, both steps of the procedure. This effect can be achieved by pressing the material through a blade lattice whose blades—at least at the back (in the direction of flow)—are longer and/or higher than the original height of the material which originated the step. Most simply, the desired increase in the height-dimension can be achieved by pressing the initial material out of a pressing chamber whose height corresponds to the desired final height to be achieved in this step of the process through a single-rowed blade lattice of the same height. It is also possible to allow the height of the blade lattice to increase from a value which is smaller than the desired final value, but at least as high as the height of the initial material, to the desired final value, in either a continuous or a discontinuous fashion.

A variant of this preferred form of execution of the procedure described by the invention and the apparatus designed for its operation is depicted in more detail hereinafter with reference to the schematic, exemplary diagrams. The numerical specifications which are variously presented for better clarification of how the individual steps of the process work together are, of course, only presented as examples and are in no way to be understood as restrictive.

BRIEF DESCRIPTION OF THE DRAWINGS

In the detailed description of the preferred embodiments of the invention presented below, reference is made to the accompanying drawings, in which:

FIG. 1 is an exploded isometric schematic view of the interior components of one embodiment of a processing device according to the present invention;

FIG. 2 is a longitudinal section along the plane II—II of FIG. 1;

FIG. 3 is a top plan view of the embodiment of FIG. 1 showing interior features;

FIG. 9a is a illustration of a portion of the device of FIG. 9 illustrating an upper position of the device;

DESCRIPTION OF THE PREFERRED EMBODIMENTS

Figure 4:
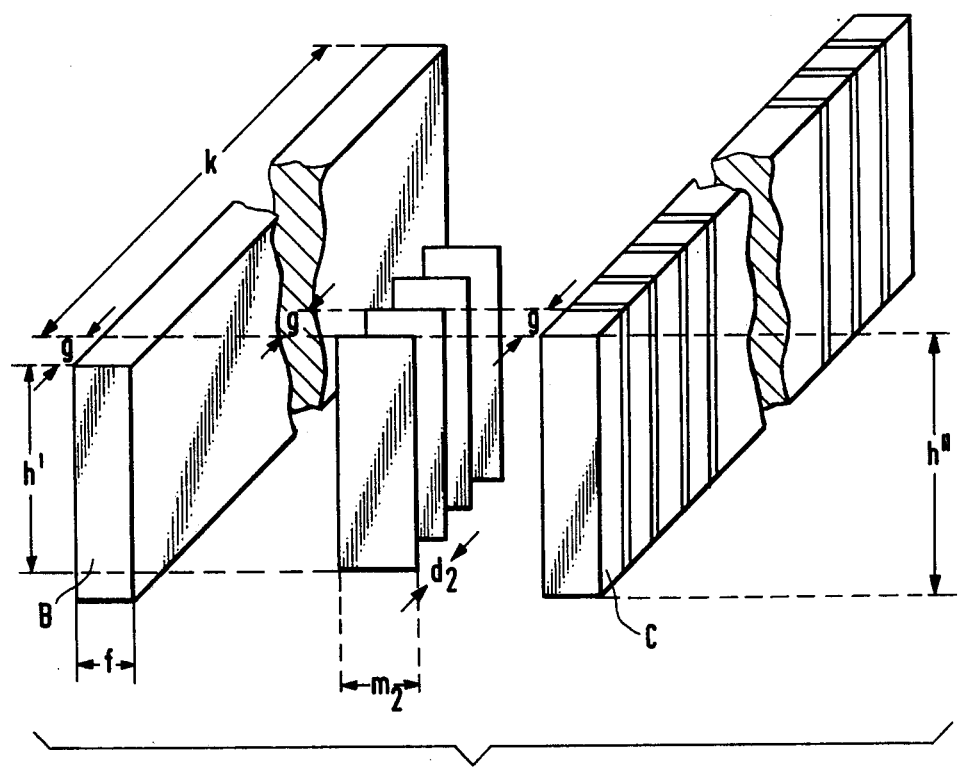
FIG. 4 is an exploded isometric view illustrating one embodiment of a device for processing plates formed by the embodiment illustrated in FIGS. 1-3.

Because frozen food processing devices are well known, the present description will be directed in particular to elements forming part of, or cooperating more directly with, the present invention. Elements not specifically shown or described herein are understood to be selectable from those known in the art.

Referring now to the drawings, with specific reference to FIGS. 1-3, an apparatus or processing device for dividing a block of deep-frozen foodstuffs, such as frozen fish filets, is illustrated. The apparatus includes a pressing chamber 1 having an interior height greater than the height h of a block A of deep-frozen foodstuffs. A pressure producing element or plunger 2 encloses one end of the pressing chamber 1 and is movable by hydraulic or other known mechanisms towards the other end of the pressing chamber. A lattice 3, which is formed of a plurality of parallel knives 4, is positioned at one end of the pressing chamber 1. As shown in FIGS. 1 and 3, the knives preferably include a tapered leading portion and have a blade thickness d and a length $m_1$.

The knives define passageways having openings facing the chamber 1 and exits communicating with a housing or battery 5. The battery 5 includes a plurality of chambers 6 aligned with the passageways defined by the knives. The chambers 6 have a height h' that is greater than the height h of the block A and are enclosed to form compartments capable of withstanding elevated pressures. Any suitable mechanism well known to those skilled in the art is provided for maintaining temperatures within the pressing chamber 1 between (−) 6° C. and (−) 30° C., preferably between (−) 15° C. and (−) 20° C. and a pressure of at least 100 at., preferably at least 180 at.

During operation, the pressing chamber 1 is brought to a desired temperature and the block A is positioned within the chamber. The chamber is then pressurized and the plunger 2 is moved towards the lattice 3. This movement forces, squeezes or presses the block A through the lattice 3 in such a manner that the knives 4 perform a plurality of cuts dividing the block into a plurality of plates or strips, for instance 18 strips, of uniform length. The cuts are performed along the cutting lines s as shown in FIG. 1. Also, since the heights of pressing chamber 1 and chambers 6 are greater than the height of the block A, the strips formed from the block are squeezed out to a greater height, i.e., the height of the chambers 6. Alternatively, the block is squeezed to a desired height before it is pressed through the lattice, or the strips formed from the block are squeezed to the desired height after they enter the chambers 6.

The length k of the chambers 6 is determined by the further processing of the produced plates B, e.g., k=310 mm. If the chamber battery is filled up to the closed-off back ends by means of pressure-proof walls 7, the plates contained in the chambers are cut off and subsequently expelled according to a known method using the movement of the chamber battery 5 transverse to the pressing direction, e.g., in the direction of the arrow P.

A control system (not shown) is provided for controlling operation of the pressing of the block through the lattice. A conventional mechanism is provided for sensing the force applied to plunger 2 to move the block A. Before the initial cuts are performed, the force has a first, high value. After the cutting has started, the force drops to a second, lower value. The force remains below the first high value until the chambers 6 are filled with the strips. Increased force is then required to press more material through the lattice 3 into the chambers 6. This increased force is sensed and, when it reaches a predetermined level, further movement of plunger 2 is stopped. The plunger is retracted and battery 5 is then moved transversely to the longitudinal axis of the knives 4 to separate the material in the chambers 6 from the material within the lattice 3. Subsequent processing of the strips is described in more detail hereinafter.

As an aid in understanding the operation of the pressing chamber 1 illustrated in FIGS. 1-3, an illustrative example will now be given.

A block with the dimensions L=802 and width b=508 mm. is positioned in the chamber 1 and split into 18 plates with a uniform width of 20 mm. apiece through the use of a blade lattice having blades with a thickness of d=7.5 mm. The pressing ratio in a horizontal direction during this operation is 1.354.

$$\frac{(18 \times 20) + (17 \times 7.5)}{18 \times 20} = 1.354$$

The pressing ratio associated with the increase in height from h=62.5 to h'=78 is 78/62.5 or 1.248 and only a small amount (1.354−1.248=0.106) is transformed into increased length.

Through the use of this typical numerical example one recognizes that the working technique used according to the invention permits the division of a block into a number of plates of the required thickness with a pressing ratio which is substantially below 1.6:1.

When the plates produced in the first step of the procedure are divided in the second step by saws or grinding wheels, the original height h of the initial block must obviously be completely squeezed up to a final desired height h″, which corresponds to the length of the finished portions, e.g., 83 mm., in the previously described first step. This is in fact possible, but it requires a somewhat higher pressing ratio of approximately 1.4:1 due to the somewhat larger blade strengths required. Also, using saws or grinding leads to the previously discussed material losses of "sawdust" or slime in the second step of the procedure.

The subsequent cutting of the plates B perpendicular to the direction of the first cuts in the second step of the procedure, so that one is left with the finished portions C, is therefore preferably carried out according to the same principles as that governing the cutting up of the block in the first step, as is schematically presented as an isometric blow-up in FIG. 4.

Because the cutting paths are substantially shorter in this step of the procedure, much less force must be applied than in the first step. Thus, substantially smaller blade strengths and a correspondingly still smaller pressing ratio are used in this step. For the same reason, transversely moveable chambers arranged behind the blade lattice are not necessary in this step of the process. More appropriately, it is sufficient to construct the blade lattice itself so that it is moveable transverse to the pressing chamber and, if desired, to close it off with a pressure-proof wall at its back end. In the example described the plate B, with dimensions 310×76×20, can be cut up into 25 finished portions with dimensions of 83×20×11.5—once the dimension h'=76 has been squeezed out to h″=83—by using a blade lattice, the blades of which have a thickness equal to or less than 1.0 mm., for instance 0.88 mm. thick. The pressing ratio in this step is, in the example presented, $$\frac{310}{310 - 24 \times 0.88} = 1.073:1.$$

Further details concerning embodiments of preferred devices used for executing the process according to the present invention and their method of operation, in addition to those already discussed in conjunction with FIGS. 1 to 4, which have deliberately been kept simple, will now be discussed in conjunction with the devices illustrated in FIGS. 5 to 15.

FIGS. 5 to 8 illustrate in more detail an embodiment of a device suitable for the execution of the first stage of the process performed by the device schematically illustrated in FIGS. 1 to 3, i.e., the formation of plates B. Subsequent division of plates B into the final portions by cutting perpendicularly to the first cut is preferably done by a device of the type illustrated in FIGS. 9 to 15.

Figure 5:
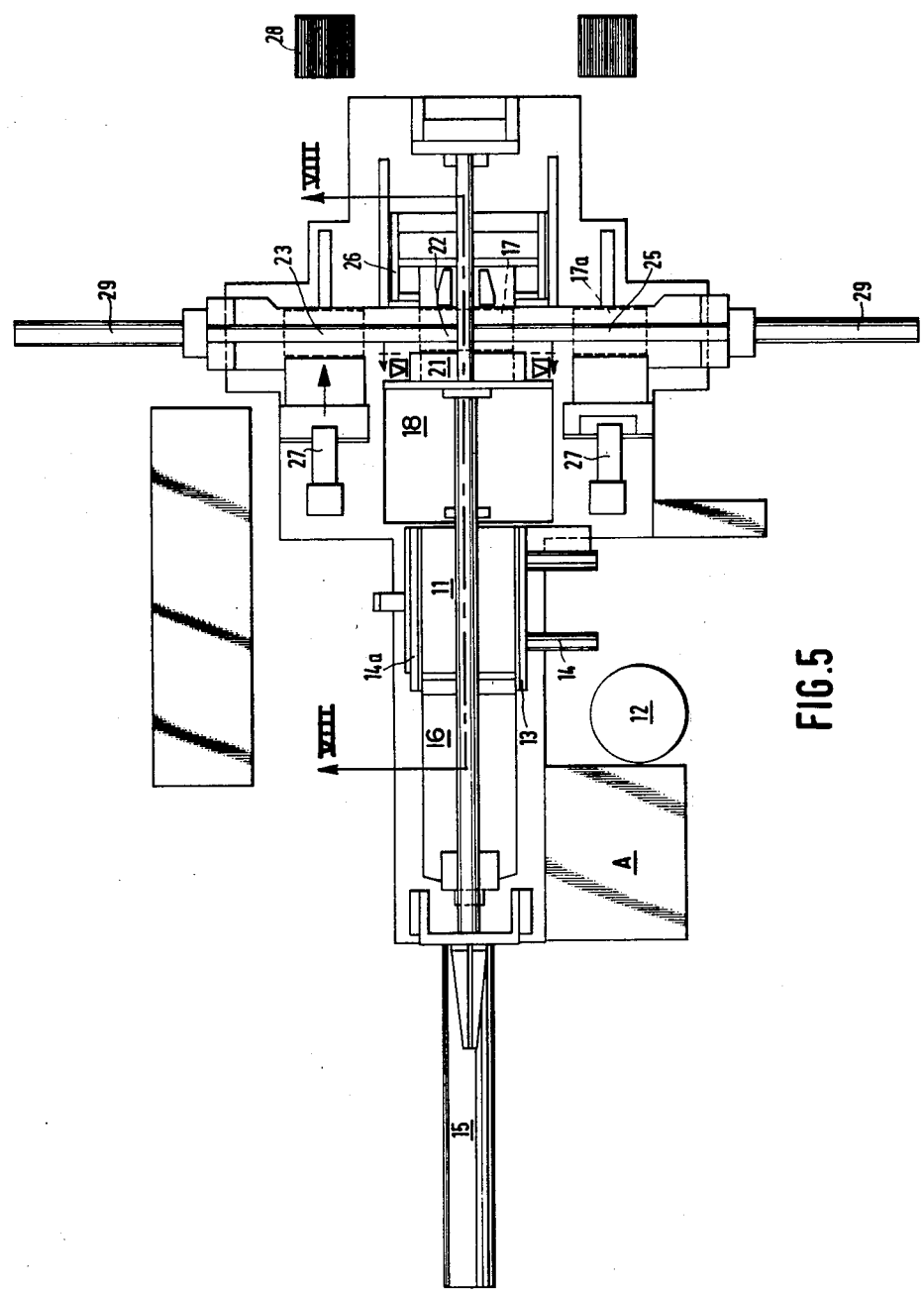
FIG. 5 is a top plan view of one embodiment of a device used for the implementation of the first step of the process of the present invention.
Figure 6:
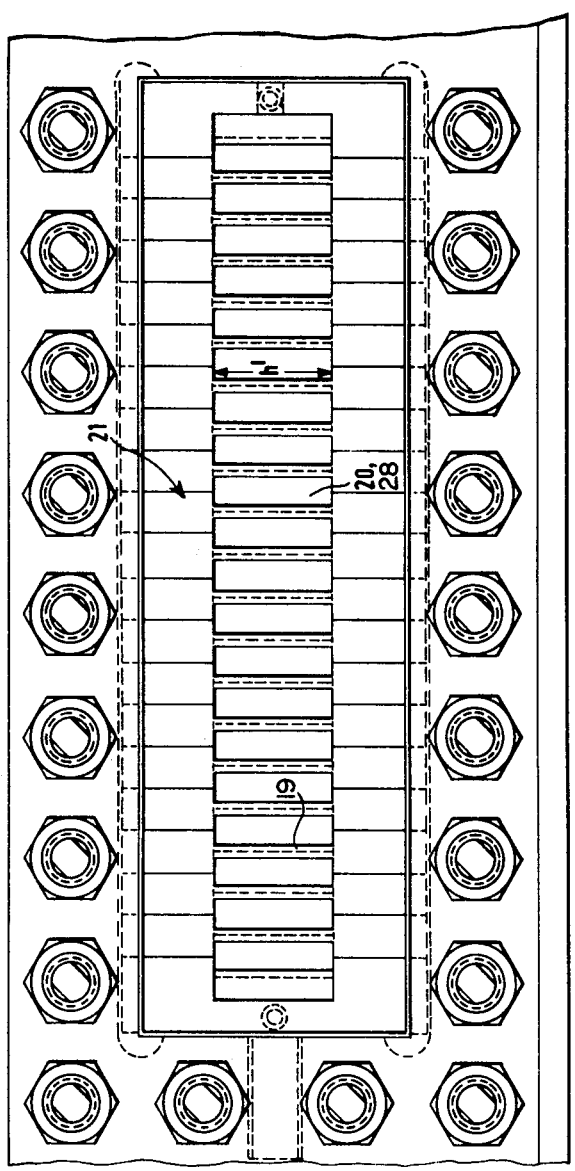
FIG. 6 is an enlarged side view taken along the plane VI—VI of FIG. 5.
Figure 7:
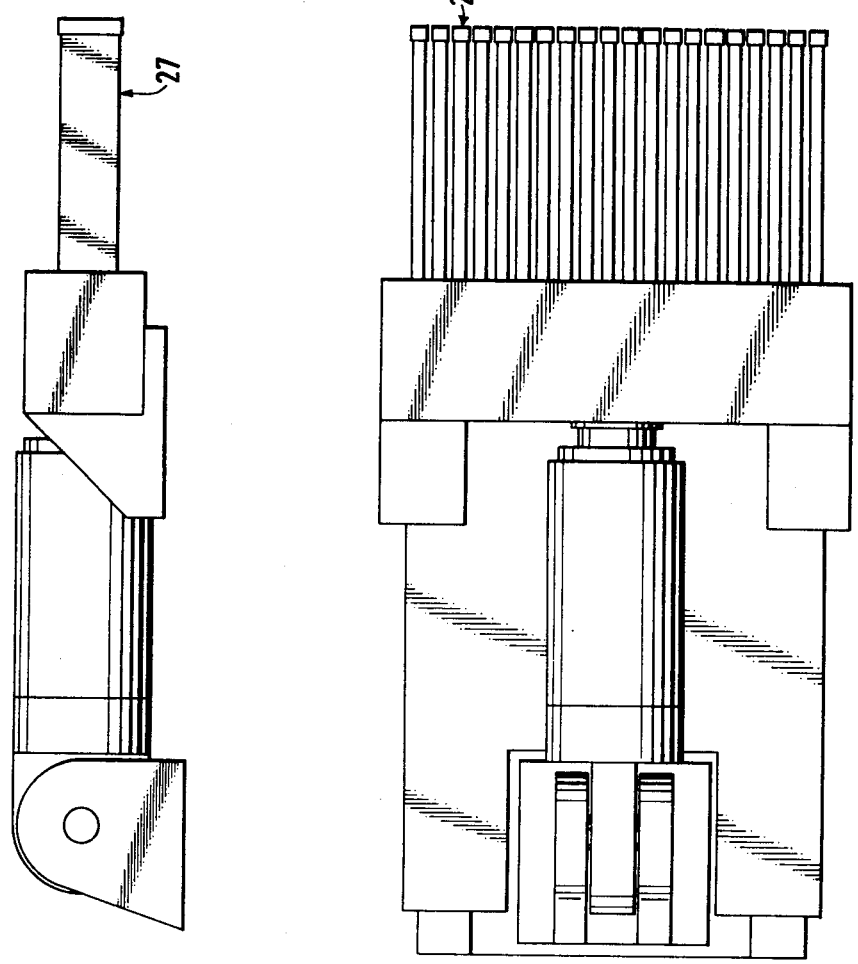
FIG. 7 is an enlarged side and top view of one embodiment of a device for removing plates formed during the first step of the process of the present invention.
Figure 8:
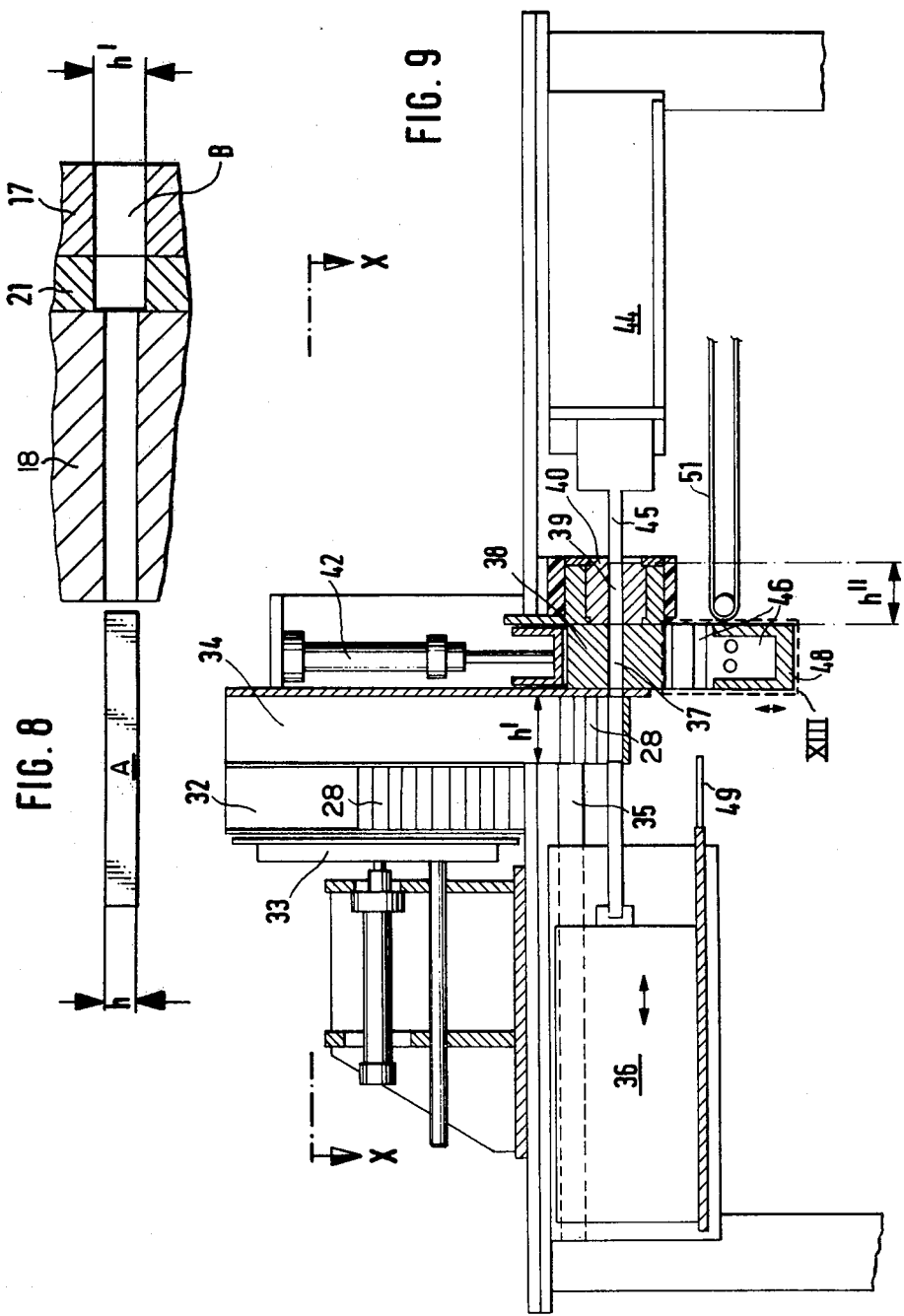
FIG. 8 is a vertical cross section along line VIII—VIII of FIG. 5.

Referring now to FIGS. 5 to 8, prepared blocks A are placed by an operator 12, such as a driven roller, on a block receiving device 13. The device 13 is in an extended position to receive the block. After receiving a block, the block receiving device 13 moves into the position shown by the reference numeral 14 in FIG. 5. A piston 16, which is similar to the plunger 2 illustrated in FIG. 2, is activated by hydraulic cylinder 15 and follows a path to the right, as illustrated in FIG. 5. Movement of piston 16 simultaneously moves block A through an opening of chamber 18 into an opening 20 of a device 21 which is subdivided by knives 19 (FIG. 6), which are similar to the knives 4 illustrated in FIGS. 1–3, into preferably compression proof chambers. During this process, block A is divided into several parallel strips B simultaneously reshaping them from their original height h of the inserted block to height h' (FIG. 8).

Each of two devices 17 and 17a represented in dotted lines and likewise preferably being compression proof are mounted on a changeable slide 25. The devices 17 and 17a have a plurality of chambers similar to chambers 6 illustrated in FIGS. 2 and 3 and are moveable between a first position which the chambers are aligned with the chambers in device 21 and a second position spaced from the first position. The two positions of the device 17 are indicated by reference numerals 22 and 23 in FIG. 5. In accordance with one embodiment of the invention, a sensing device 26 is mounted to the rear wall of the device 17 corresponding to wall 7 of row 6 illustrated in FIG. 3. The sensing device 26 stops further action of the piston 16 as soon as all chambers in device 17 are filled with the material to be processed and as soon as the respectively desired pressure has built up at the piston.

Subsequently, hydraulic lifts 29 of the changeable slide 25 move device 17 from position 22 to position 23, thereby cutting the emerging strips by device 17 to the final length B (FIG. 8) hereafter referred to as plates. Simultaneously, device 17a is moved into position 22.

The cut-off plates subsequently are positioned in front of one of two push-out combs 27. The push-out comb 27 (FIG. 7) subsequently moves to the right simultaneously with the piston 16, activated by the hydraulic system 15 and moves the plates to a conveying belt (not shown). This movement occurs while piston 16 is in its next work cycle. The plates removed from the devices 17 and 17a are identified by the reference numeral 28 in FIG. 5.

This process is repeated until the inserted block A is completely processed and piston 16 has returned to its position shown in FIG. 5, whereupon the operator 12 places a new block A on the device 13. As previously mentioned, further processing of plates to obtain the final portions can take place by use of the device represented in FIGS. 9 to 15.

Figure 9:
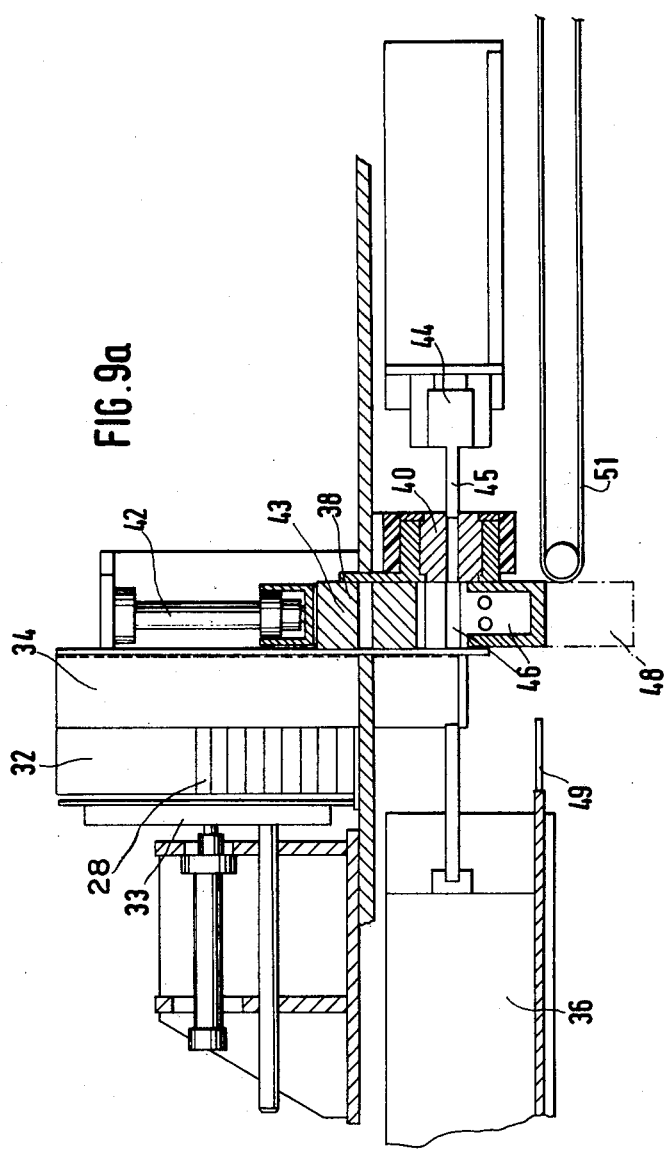
FIG. 9 is a vertical cross section along line IX—IX of FIG. 10 of one embodiment of a device used for implementing the second step of the process of the present invention.
Figure 10:
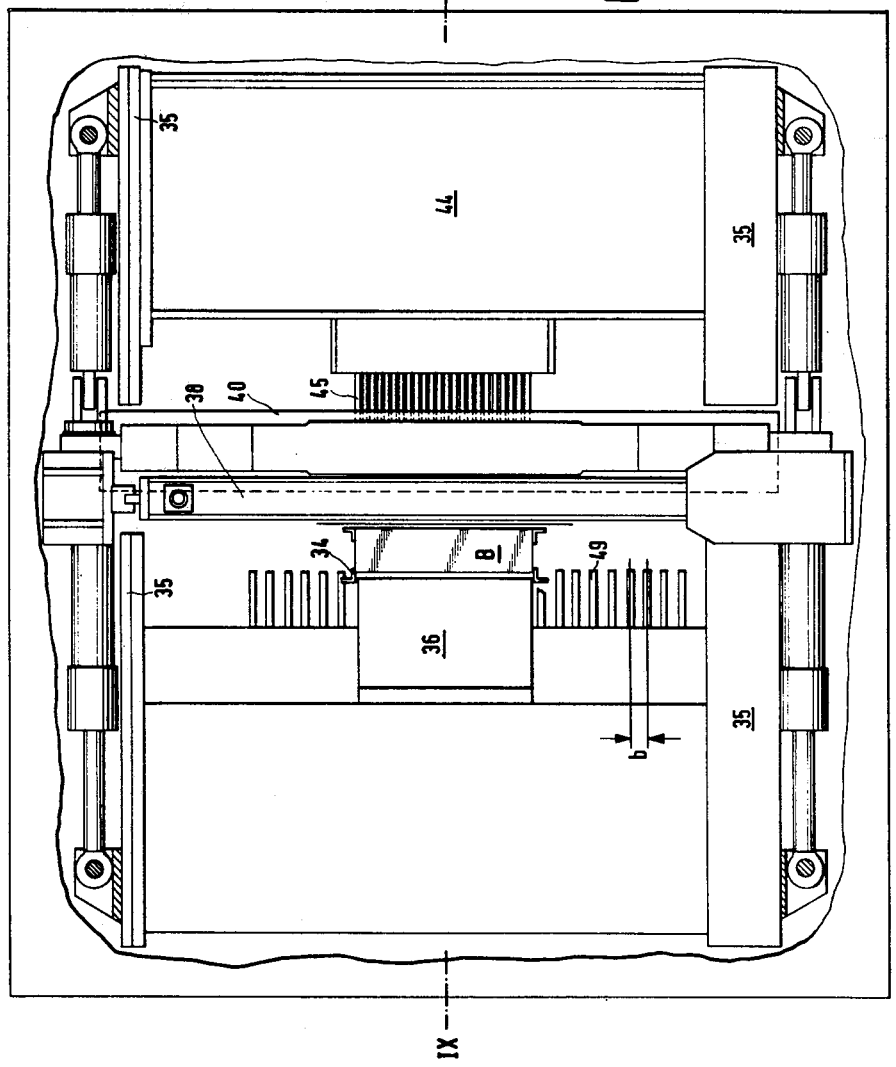
FIG. 10 is a horizontal cross section, partially cut away, along line X—X of FIG. 9 in which a loading tray has been omitted to allow a better view.
Figure 11:
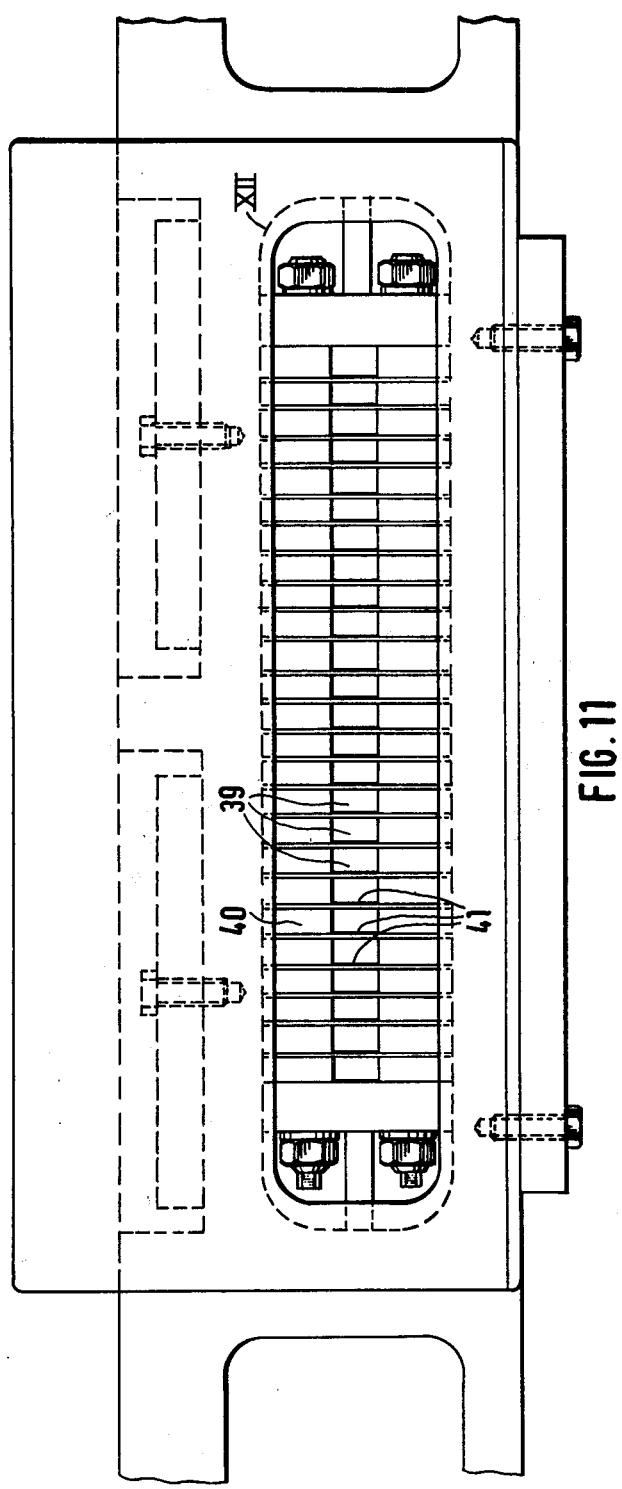
FIG. 11 is an enlarged detailed view of a portion of the device illustrated in FIG. 10.
Figure 12:
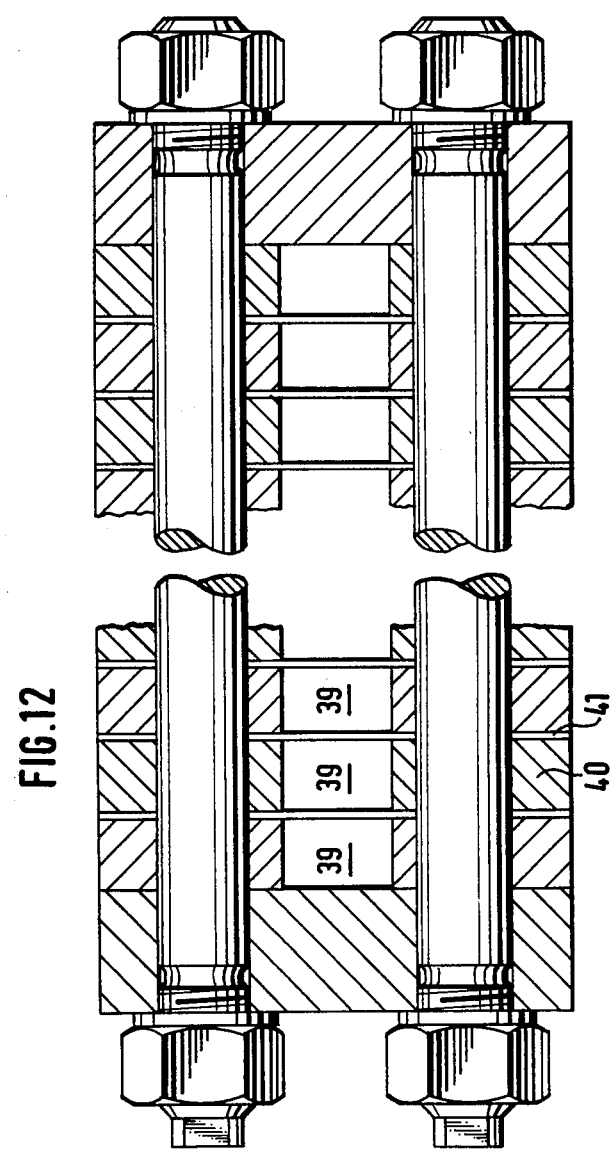
FIG. 12 is an enlarged view of the encircled section XII in FIG. 11.

As illustrated in FIGS. 9–15, the group of plates 28 are loaded in a pre-chamber 32 and moved into a chamber proper 34 by a loading tray 33. A loading cartridge 36 running on guide rails 35 moves one of the group of plates 28 from the chamber 34 through the opening 37 of a pre-chamber 38 into an opening 39 of a device 40. The loading carriage 36 immediately returns to its original position as shown in FIG. 9.

In the opening or passageway 39 of device 40 are mounted a number of vertical, parallel standing knives 41 (FIGS. 11 and 12), in between which the plates are squeezed through and thereby divided into a number, e.g., 20 strips, simultaneously increasing the "height" of these strips from h' to h", a height corresponding to the volume displaced by the thickness of the knives (shown lying horizontally in the embodiment illustrated in FIG. 9).

Subsequently, the pre-chamber 38 is lifted by cylinder 42 from a lower position 48 illustrated in FIG. 9 to an upper position 43 illustrated in FIG. 9a.

Subsequently, a slide-out carriage with comb-like sliding devices 45 (illustrated enlarged in FIG. 14) moves into the openings 39 of the device 40 and moves the strips located there to the left into the openings 47 (FIGS. 13 and 15) of a turning and distribution device 46. Immediately thereafter, the slide-out carriage 44 returns to its original position shown in FIGS. 9 and 9a.

Figure 13:
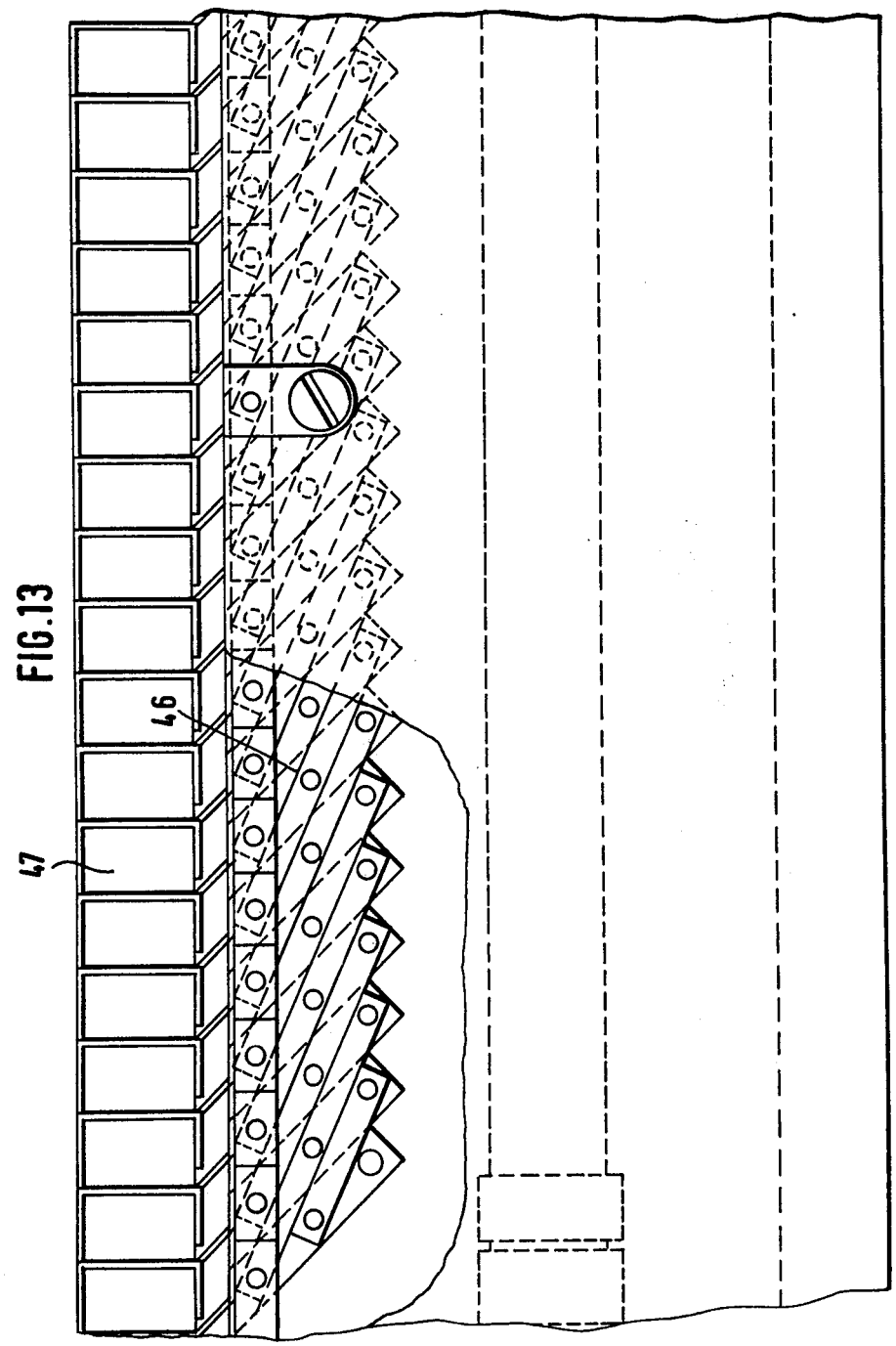
FIG. 13 is an enlarged view of the encircled section XIII in FIG. 9.
Figure 14:
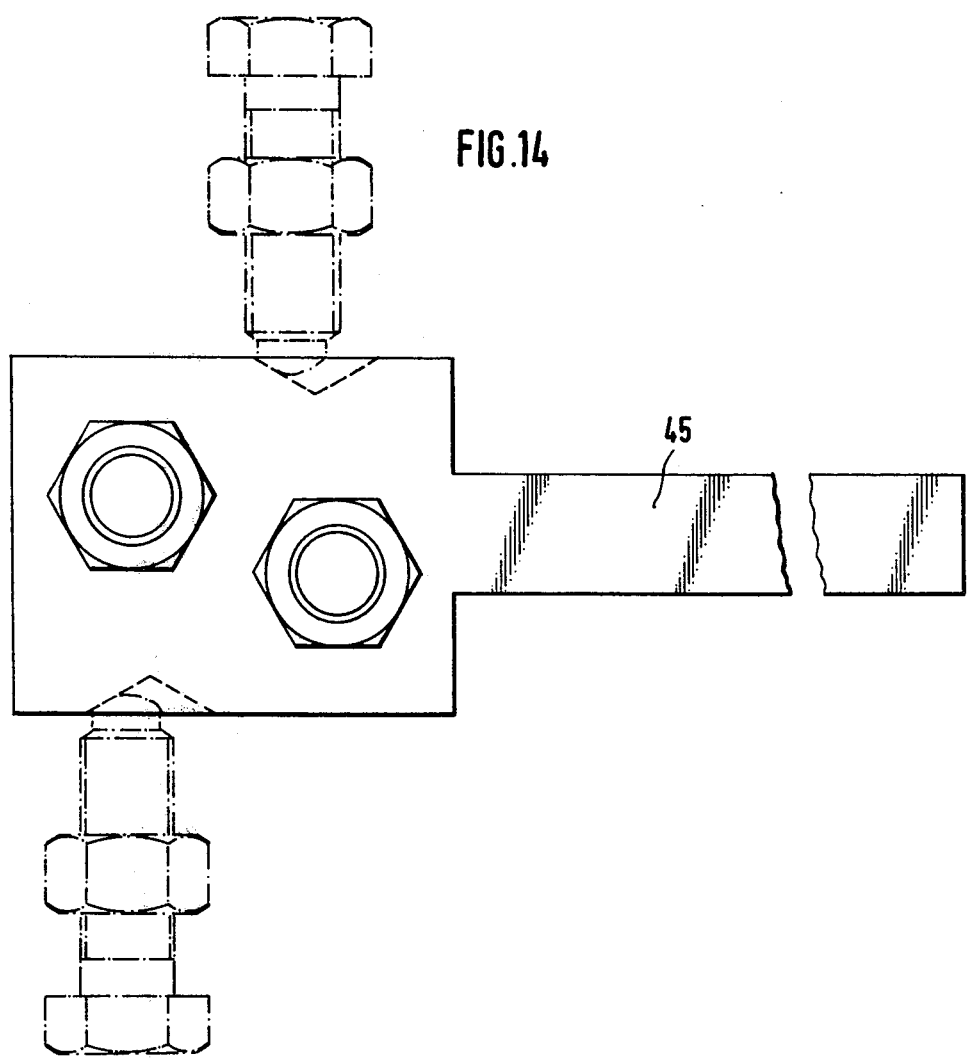
FIG. 14 is an enlarged view of one component of the device illustrated in FIG. 9.

Below the pre-chamber 38 and rigidly connected thereto is turning and distributing equipment 46, which is illustrated on a larger scale in FIG. 13. FIG. 13 is therefore an enlargement seen from the left of the section XIII encircled in FIG. 9. Due to the rigid connection of this turning and distribution device 46 with the pre-chamber 38, device 46 with its opening 47 is lifted together with pre-chamber 38, as said pre-chamber 38 is raised and is moved before the openings in device 40.

Figure 15:
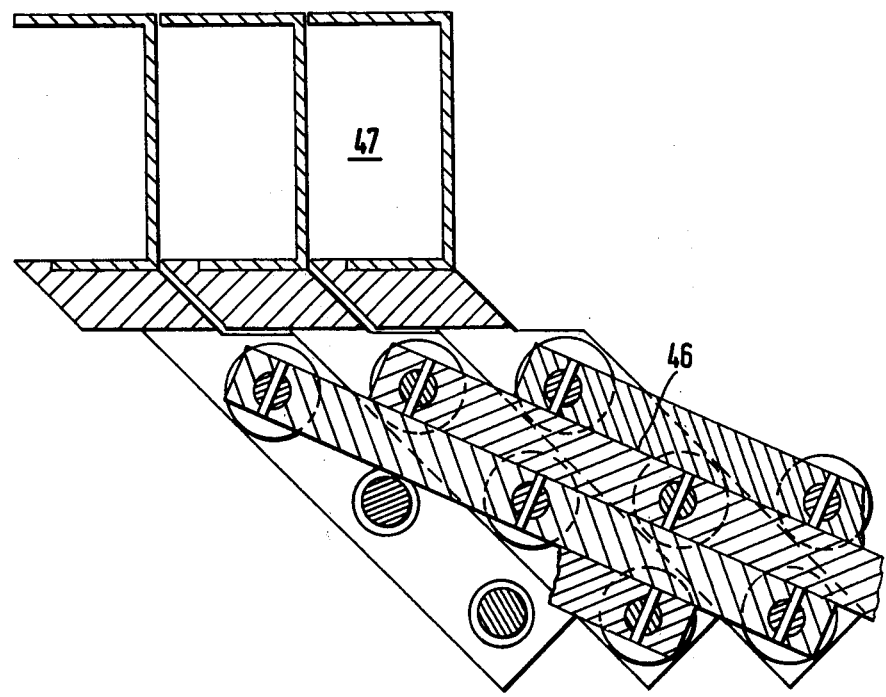
FIG. 15 is an enlarged view of a portion of FIG. 13.

While the pre-chamber 38 shown in position 43 in FIG. 9a and the turning and distributing device 46 rigidly connected thereto return again downward into position 48, scisor-like members of part 46 are spread out and thereby rotated by 90° (FIGS. 13 and 15). The strips located in the openings 47 are simultaneously spread out and rotated by 90° so that they are no longer resting on their narrow sides as in the openings, but on their wide side at the end of the process. The strips thus laid flat and positioned at intervals b (FIG. 10) from each other are subsequently moved onto a conveyor belt 51 (FIG. 9) by rods 49 disposed on the loading carriage 36 advancing toward the right. Simultaneous with the advancement of the loading carriage 36 to the right, a new plate is retrieved from chamber 34 and pressed into the device 40 by means of the loading carriage thus introducing the next work cycle.

The invention has been described in detail with particular reference to preferred embodiments thereof, but it will be understood that variations and modifications can be effected within the spirit and scope of the invention.

I claim:

1. A method for the division of a block of deep-frozen foodstuffs, especially a frozen block of fish filets, into portions of predetermined size, the method utilizing a processing device operating at temperatures between −6° C. and −30° C. and at a pressure of at least 100 at. and comprising:

squeezing the block in a first direction perpendicular to its largest surface through a first blade lattice formed of parallel knives positioned in such manner as to define openings narrowed in the direction of movement thereby carving the block into a row of plates of uniform thickness by first cuts perpendicular to a given surface of the block;

simultaneously squeezing the block in a direction perpendicular to said first direction so that the height of the plates is greater than the height of the block; and carving the plates formed by squeezing the block through the first blade lattice into portions of predetermined size by performing second cuts perpendicular to said first cuts, the second cuts also being perpendicular to the largest surface of the frozen block of fish fillets.

2. A method according to claim 1 wherein the processing device includes chambers connected to the first blade lattice and characterized in that the plates formed by squeezing the block through the first blade lattice are pressed into said chambers, the chambers being closed at their ends opposite the blade lattice so that pressure builds up in said chambers as the blades are pressed into said chambers.

3. A method according to claim 1 characterized in that the squeezing of the block utilizes a pressing ratio equal to or less than 1.6:1.

4. A method according to claim 1 wherein the processing device includes a second blade lattice formed of parallel knives and characterized in that the carving of the plates formed by squeezing into the portions of predetermined size includes squeezing the plates through the second blade lattice in a direction transverse to the direction of the first cuts and perpendicular to the smallest dimension of the frozen block, said squeezing being done at temperatures between −6° C. and −30° C. and under the application of at least 100 at. pressure.

5. A method according to claim 1 wherein the step of carving the plates includes:

squeezing the plates through a second blade lattice to perform the second cuts, the second cuts being performed in a direction along the original height of the block; and simultaneously squeezing the plates in such manner that elongation of the plates occurs only in the direction of the original height of the plates.

6. A method according to claim 5 wherein the first blade lattice is arranged with the knives oriented in a generally vertical direction so that the first cuts are generally vertical cuts thereby forming vertically extending plates, and wherein the step of carving the plates includes rotating the plates from a vertical to a horizontal orientation; and squeezing the plates through the second blade lattice in a generally horizontal direction.

7. A method according to claim 3 characterized in that the squeezing of the block utilizes a pressing ratio at least equal to 1.375:1.

* * * * *